Figure 1:
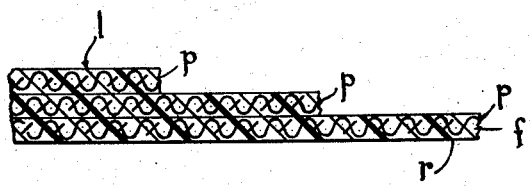

2,827,946
Patented Mar. 25, 1958

2,827,946

LAMINATES COMPRISING ALKENYL SUBSTITUTED PHENOLIC RESINS AS BINDERS

Roger M. Christenson, Whitefish Bay, Wis., and Richard A. Freeman, Rockford, Ill., assignors to Pittsburgh Plate Glass Company Application March 9, 1954, Serial No. 414,976

6 Claims. (Cl. 154—2.6)

This invention relates to a resinous product comprising a reinforcement of fibrous material embedded in or coated with a heat converted resin and to a method of preparing the same; the invention has particular relation to a product of the foregoing type in which the resin is derived by heating a condensation product of an aldehyde and a phenol, said phenol containing an ethylenically unsaturated side chain.

It has long been recognized that valuable heat convertible polymeric products can be obtained by condensation of an aldehyde such as formaldehyde (or a substance reacting to produce the same) with a phenol free of functioning groups other than phenolic hydroxyl groups. The reaction apparently involves elimination of water through condensation between the hydroxyls and the carbonyl groups of the aldehyde. The overall effect of the reaction is to build up macromolecules to provide thermoset resinous products.

It has also been suggested to employ liquid condensation products of the foregoing phenols and aldehydes to soak or to coat sheets of fibrous materials such as fabrics, paper mats, or similar fibrous bodies. These, with, or without subsequent stacking of the sheets as laminates, were confined under pressure, between suitable surfaces to cure them to hard thermoset state. Bodies thus formed, were valuable as dielectrical materials and could be used as supporting panels or as coatings, or coverings for electrically charged bodies of various types. However, most of the phenolic condensation products as previously prepared, have not been entirely satisfactory in certain respects. For example:

Most of them tended to be slow in curing and required either an excessive period of time for the cure, or else they required the application of heavy pressure to arrive at a satisfactory degree of molecular aggregation within a reasonable period of time.

Many of them were low in such physical values as tensile strength, flexural strength, impact strength, and molulus of elasticity. This was especially true of those materials having good dielectric properties.

The dielectric strength also was such that it was necessary to accept a value of 500 to 340 volts/mil for short application, or 360 to 250 volts/mil for step-by-step application, as standard.

The previously known products were often of poor gloss and tended to be objectionably discolored.

In copending applications of Roger M. Christenson, Lowell O. Cummings and Alfred R. Bader, entitled Phenolic Resins, Serial Numbers 390,088 and 390,089, filed November 13, 1953, it is disclosed to form resinous condensation products of aldehydes such as formaldehydes and mixtures of phenols containing alkenyl side chains in the presence of an acid or preferably an alkaline catalytic agent. By use of such process, liquid or soluble resin intermediates are obtained, which contain ethylenically unsaturated side chains and which presumably, have a capacity for addition reaction whereby to induce formation of macromolecules characterizing a resin.

It has now been discovered that valuable materials having excellent dielectric properties can be formed by appropriate incorporation of the foregoing condensation products as bonding agents into one or more layers of fibrous materials such as sheets of paper or various fabrics in order to provide valuable dielectric materials which can be used as panels for electrical instruments and parts or for insulatively covering electrical parts and apparatus. Articles involving fibrous materials bonded with the resins are exceptionally light in color, a property which apparently is not found in articles employing other phenolic resins as bonding agents.

For a better understanding of the invention, reference may now be had to the accompanying drawings in which like numerals refer to like parts and in which Figure 1 is a fragmentary side view of a laminated electrical panel constructed in accordance with the provisions of this invention.

Figure 2:
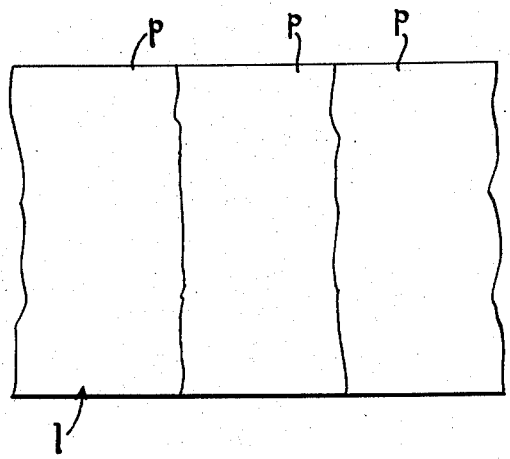

Figure 2 is an elevational view of the construction shown in Figure 1.

In the drawing a laminate comprises a plurality of plies of fibrous materials which are indicated as being embedded in and bonded together by the resinous material, as hereinafter described. But three plies are shown; however, it will be apparent that this number can be increased or decreased as desired.

Phenols containing alkenyl substituted side chains suitable for condensation with aldehydes such as formaldehyde (or formaldehyde yielding substances) to provide resinifiable materials, can be obtained by reacting a phenol containing a free hydrogen atom in the ring with a conjugated diene such as butadiene under appropriate conditions. In preparing condensation products of aldehydes such as formaldehyde and alkenyl substituted phenols such as mixtures of butenylphenols, for use as binding agents for the fibrous materials in the dielectric products of this invention, relatively pure alkenylphenols such as ortho- or para-alkenylphenols or di- or trialkenylphenols may be employed. However, it is usually preferred and more economical to employ mixtures of the alkenyl substituted phenolic compounds.

The proportions of the various permissible alkenyl compounds with respect to each other, are susceptible of relatively wide variations. Ordinarily, the predominate component of the mixture is one or more monoalkenylphenols including ortho- and para-monoalkenylphenols and preferably the monoalkenyl component constitutes about 55 to 85 percent by weight of the total mixture. The balance of the mixture (about 15 to 45 percent by weight) is composed primarily of di- and trialkenylphenols, although phenolic materials including polyphenols such as alkenyl substituted di- or triphenol may be also present in an amount depending upon the method by which the alkenylphenol mixture is prepared.

Mixtures of alkenylphenols suitable for reaction with such aldehydes as formaldehyde (or formaldehyde yielding substances) by condensation, to form useful binders in the sheet products of this invention, are readily obtained by the methods described in copending applications, Serial Number 300,359, filed July 22, 1952, and Serial Numbers 337,226, 337,227, 337,228, now abandoned, and 337,229, now abandoned, all filed February 16, 1953.

The methods of preparing alkenyl substituted phenols described as the phenolic component in these copending applications, involve the reaction of conjugated dienes with phenolic compounds in the presence of certain catalysts such as Friedel-Crafts compounds, or Lewis acids. For example, the reaction product obtained by the reaction of butadiene-1,3 with phenol in the presence of an aqueous sulfuric acid catalyst is generally composed of less than about 15 percent unreacted phenol, less than about 5 percent of ethers, 55 to 70 percent by weight of monobutenylphenols and 15 to 40 percent of the higher boiling phenols including di- and tributenylphenols and polyphenols. Ordinarily, the unreacted phenol and ethers will be removed from the reaction mixture by distillation before the condensation reaction with an aldehyde is carried out; however, this is not a critical step and condensation reaction takes place readily even though the unreacted phenols and ethers are not removed. Mixtures containing smaller quantities of monoalkenylphenols and larger quantities of the higher boiling phenols, for example, about 50 percent of monoalkenylphenols and 30 to 50 percent of higher boiling phenols and the balance polyphenols and ethers, may also be employed with good results, as may mixtures containing no monoalkenylphenols. Also, the mixtures may be composed entirely of ortho- and para-monoalkenylphenols and in fact, excellent resins are obtained when such a mixture is employed. Mixtures of alkenylphenols with other phenols containing no unsaturated side chain, such as phenol, butylphenol, amylphenol and the like may be employed in the preparation of thermosetting compositions for use in the preparation of fiber-reinforced dielectric products of this invention.

While the foregoing techniques are usually preferred in the preparation of mixtures of alkenylphenols and such mixtures so prepared may be reacted with formaldehyde to provide thermosetting condensation products of exceptional merit in the dielectric art it is to be understood that other methods may sometimes be employed to provide useful mixtures of alkenyl substituted phenols. This invention includes the use of such other mixtures of phenols where the latter are of the character of those above described, regardless of the method by which they are obtained.

As illustrative of the alkenyl substituted phenolic compounds, which singly, or preferably in mixtures, are condensed with an aldehyde such as formaldehyde (or a formaldehyde yielding compound) to form the novel resins that can be applied to fibrous reinforcement to form the novel sheet materials of the present invention, there are set forth below the products of the reaction of butadiene-1,3 and phenol:

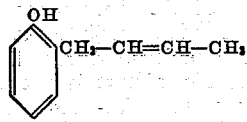

I

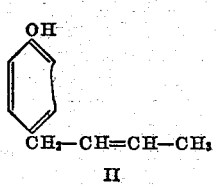

II

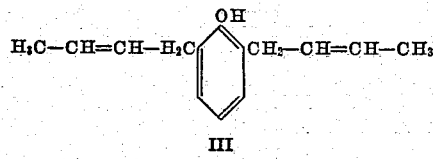

III

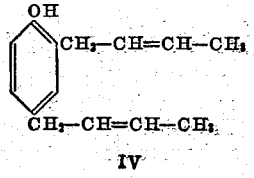

IV

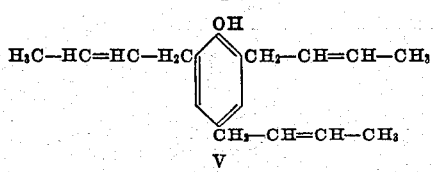

V

The above structures are all readily obtained by the reaction of phenolic compounds with conjugated dienes in accordance with the methods described in the copending applications.

Phenolic compounds which may be reacted with conjugated dienes and notably butadiene, to give compounds of the above structures include: phenol, catechol, resorcinol, pyrogallol, tertiary butyl catechol, beta-naphthol, guaiacol, o-, m- and p-cresol, 2,3-xylenol, 2,5-xylenol, 3,4-xylenol, and the like alkyl substituted phenols, bis-(4-hydroxyphenyl) 2,2-propane, and the like.

Typical conjugated dienes which react with phenolic compounds to form the desired mixture of alkenylphenols include butadiene-1,3, 2-methylbutadiene-1,3, piperylene, 2-methyl-pentadiene-1,3, hexadiene-1,3, 1-chloro-2-methylbutadiene-1,3, cyclopentadiene, and the like. However, butadiene is presently preferred and is particularly emphasized.

The preferred alkenylphenolic compounds for condensation with aldehydes in accordance with the present invention are mixtures of monohydric compounds, namely, the butenylphenols, including ortho- and para-2-butenylphenols, di-2-butenylphenol and tri-2-butenylphenol. However, mixtures of other alkenylphenolic compounds may also be used, including butenylcresols, butenylcatechols, butenyl-2,5-dichlorophenols, butenyl-2,5-dinitrophenols, butenyl-2,3-dimethoxyphenols, mono-, di- and tributenyl-resorcinol, mono-, di- and tributenylguaiacol, 2-chlorobutenylcresol, 2-chlorobutenylphenol, 2-iodobutenylphenol, ortho- and para-cyclopentenylphenol, pentenylphenol, pentenylcresol, pentenylguaiacol, halopentenylphenols, halopentenylguaiacols, and the like (halogen may be chloro-, bromo- or the like).

It may be that the tributenylphenols, where they are present in the mixtures, do not actually condense with aldehydes, at least to the same extent as do the mono- and dialkenylphenols, but instead react through the unsaturated linkages or by other mechanism. This type of reaction is, of course, not possible with conventional phenols and this fact may account, at least in part, for the improved electrical properties and faster cures characterizing the thermosetting compositions, when they are employed as binder resins for reinforcing fibers of various types.

In the preparation of the condensation products which are used in the practice of the present invention, any aldehyde may be utilized to provide products of utility. However, aldehydes containing only atoms of carbon, hydrogen, and oxygen and particularly formaldehyde, are preferred. In place of formaldehyde, a material which decomposes upon heating to yield formaldehyde, or which otherwise reacts to produce the same products with the phenolic compounds as formaldehyde, may be employed. Such aldehyde-yielding compounds include paraformaldehyde or trioxymethylene. An aqueous 37 percent solution of formaldehyde is generally used very successfully.

In carrying out the condensation involved in the preparation of the binder resins, various catalytic agents may be employed. For example, acids may be employed. However, the alkaline catalysts are usually preferred. Suitable alkaline catalysts include: sodium hydroxide, potassium hydroxide, barium hydroxide, sodium carbonate, potassium carbonate, ammonia, hexamethylenetetramine and the like. These alkaline materials effectively produce a condensation reaction between the alkenylphenol and the aldehyde to provide liquid, or soluble products which when applied as binders to various fibrous materials, can be cured by application of heat and pressure to form dielectric panels and similar products. These are of light color, which is within itself, a surprising result since it has previously been contended that alkaline materials were the cause of the objectionable color in resinous products.

The quantity of alkaline catalyst employed in the condensation reaction is, generally, such that about ¼ equivalent of catalyst is present for each equivalent of alkenyl phenol compound. Based upon the total weight of reactants, about 0.5 to about 5 percent of the alkaline material is utilized. Large amounts of the catalyst may be employed if desired, but, of course, the use thereof tends unduly to increase the expense involved in the reaction without added advantages in other respects.

While useful thermosetting condensation products are obtained with a relatively wide range of molar ratios of aldehyde to alkenylphenols, it has been found that the best products for use in the formation of impregnates for use in the electrical art are obtained when about two moles of an aldehyde such as formaldehyde are utilized for each mole of the alkenylphenolic compounds in the reaction mixture. For some applications, however, the lower limit of aldehyde may be about 0.5 to 1 mole per mole of the alkenyl phenol and the upper limit of the aldehyde ratio may be as high as about 5 moles per mole of the phenolic compound. For most purposes, these extremes are not desirable. Usually, when the aldehyde content is dropped substantially below about 1.5 moles per 2 moles of the phenolic compound, the resinous products tend to be hard and difficult to process. If the ratio of aldehyde is increased substantially above 1.5 moles per mole of the alkenyl phenol, good products may be obtained but the process tends to be uneconomical since the products are little, if any, better as thermosetting reinforcements for dielectrics of fibrous materials than those containing more moderate amounts of aldehyde.

In the preparation of the thermosetting condensation products of this invention, the reaction is best effected by first admixing the alkenylphenols and the catalysts under non-oxidizing conditions, e. g. under an inert atmosphere such as nitrogen and/or in the presence of a reducing agent such as sodium hydrosulfite, while the reaction mixture is cooled to maintain the temperature at about room temperature (25° C.). The aldehyde is added slowly at this temperature level until solution of the phenolic component is obtained, after which the temperature is allowed to rise to 35° C., at which level it is maintained until the remainder of the aldehyde is incorporated. During the period of the reaction, care should be taken to keep traces of air out of the reactor at all times. The reaction is allowed to proceed for about 48 hours at room temperature.

At the end of this time, the reaction mixture is carefully acidified to a pH of about 5 with a mineral acid such as hydrochloric acid, or sulfuric acid, or with a carboxylic acid such as acetic acid, or propionic acid. During the acidification two layers are formed, one being a water layer and the other an alkenylphenol resin layer. The water layer is drawn off and the water-insoluble layer of resin is water-washed four or five times.

At this point, it is advantageous to add about 0.1 percent by weight, based upon the resin, of a sequestering agent such as aminotetracarboxylic acids such as ethylenediamine tetraacetic acid which form non-reactive complexes with any iron in the reaction mixture. The latter element, which if free, or otherwise present in active form, would produce instability with resultant darkening of the product, is thus bound and in effect, is eliminated from the system.

Resin products may be freed of water by application of vacuum stripping under a pressure of about 20 to 55 mm. (absolute). Alternatively, water may be removed by adding xylene or toluene or butanol to the condensation product and conducting an azeotropic distillation. They may, also, be blown with inert gas ($CO_2$ or $N_2$) to remove water.

The resinous products prepared by the foregoing techniques are generally recovered as viscous liquids which with, or without dilution, can be employed to impregnate sheets and mats of fibrous materials such as alpha-cellulose or fiber glass to provide valuable dielectrics, under the provisions of the present invention.

While the above described method for carrying out the condensation is preferred, particularly when the alkenylphenol mixture is a mixture of butenylphenols, other methods of carrying out the condensation may be employed. For example, useful liquid condensation products which can be employed to impregnate or to coat fibrous materials may be obtained simply by admixing the reactants and an acid or alkaline catalyst and allowing the mixture to stand at room temperature for about 48 hours, or by maintaining the reaction mixture at a temperature as high as 100° C. or even higher. In event that higher temperatures are utilized, the condensation will, of course, require less time than when the reaction is conducted at room temperature.

Acid catalyzed condensation products of alkenyl phenols and aldehydes tend generally to be hard and resinous, however, the acid catalyzed condensation proceeds through a stage during which the resinous product can be recovered as a liquid, such acid catalyzed liquid condensation products may be employed to bond fibers in the preparation of useful dielectrics.

The preparation of butenylphenols which can be condensed with aldehydes such as formaldehyde in the presence of an alkaline catalyst to form liquid resins suitable for use as bonding agents in the preparation of dielectrical materials is illustrated by the following examples:

EXAMPLE A

A 54 gram quantity (1 mole) of butadiene-1,3 in 100 milliliters of toluene was added to a mixture of 94 grams (1 mole) of phenol containing 100 milliliters of toluene, 23 grams of polyphosphoric acid and 10 grams of 85 percent syrupy phosphoric acid, to initiate an exothermal reaction. The reaction mixture was then cooled to room temperature and was stirred for 14 hours to provide a condensation product which was washed with water and the mixture was fractionally distilled. A mixture comprising 60 grams of monobutenylphenols, namely, ortho- and para-butenylphenols and minor quantities of di- and tributenylphenols was obtained. The mixture was suitable for incorporating with aldehydes such as formaldehyde together with alkaline catalysts and condensation to provide liquid resins that could be employed to impregnate paper or glass fabrics. The impregnates, when cured, are of excellent dielectric properties.

EXAMPLE B

In this example, 28 grams of titanium tetrachloride were added to a mixture of 94 grams (1 mole) of phenol, 65 grams (1.2 moles) of butadiene-1,3 and 200 milliliters of toluene cooled to a temperature of −10° C. An exothermic reaction resulted and the reaction mixture was maintained at room temperature for 16 hours. The reaction mixture was washed to remove the catalyst and was subjected to distillation under reduced pressure. A yield of monobutenylphenols of about 85 percent, together with minor quantities of di- and tributenylphenols, was obtained.

This mixture, like that from Example A, was suitable for condensation under alkaline conditions, with aldehydes, e. g., formaldehyde, to form liquid resins, useful for impregnating fibrous sheets in forming valuable dielectrical bodies which often are of unusually light color.

EXAMPLE C

In the performance of this example, 17 pounds of toluene, 17 pounds of phenol and 28.8 pounds of 67.2 percent sulfuric acid were charged into a glass-lined reactor having an agitator and heating means. The reactor was then sealed and 10.3 pounds butadiene-1,3 were fed into the reaction mixture in the container over a period of 15 minutes, the temperature being maintained at about 55° F. during the addition. The reaction mixture was agitated for 18 hours, at the conclusion of which time it was allowed to settle and the acid layer was drawn off. The remainder of the reaction mixture was neutralized with sodium carbonate and the mixture was subjected to distillation to remove toluene. The product comprised 59 percent of monobutenylphenols. Dibutenylphenols constituted 8 percent; higher boiling phenols constituted 29 percent, and unreacted phenols and ethers constituted 4 percent. This product comprised mixed phenols which could be reacted with formaldehyde in accordance with this invention (preferably in the presence of an alkaline catalyst) to provide viscous resin products suitable for incorporation with fibrous materials. When the resultant impregnates were suitably cured, they possessed valuable dielectric properties and light color.

The following examples illustrate the condensation of butenylphenols prepared by such methods as are described in Examples A, B and C, with formaldehyde in the presence of alkaline catalysts. The resultant products could be applied to paper comprising alphacellulose, or to fabrics of glass fibers, or to sheets of asbestos fibers or other similar fibrous materials to provide useful dielectrics such as are described in certain of the later examples.

EXAMPLE A-1

In this example, several samples using different aldehydes were prepared:

*Sample 1*

In this preparation, 148 parts by weight of a mixture of monobutenylphenols (primarily ortho- and paramonobutenylphenols) and 10 parts of sodium hydroxide in 100 parts of water were mixed under an atmosphere of nitrogen or other gas designed to protect the ethylenic group. The mixture was sufficiently cooled to maintain the temperature below about 35° C. When a homogeneous solution was obtained, 162 parts of 37 percent formalin (methanol free) containing 60 grams (2 moles) of formaldehyde were added at a moderate rate while the mixture was cooled to keep the temperature below about 35° C. The mixture was stirred for 48 hours at room temperature, at the end of which time the reaction mixture was acidified to a pH of 5 with a mixture of concentrated hydrochloric acid and water in equal parts by weight. A water-insoluble layer, which constituted the desired resin, was formed and was washed four times with lukewarm water. The resin product was then dehydrated by vacuum stripping under a pressure of 20 to 50 millimeters of mercury (absolute). The yield, based on the quantity of alkenylphenols employed, was 120 percent. The color of the product was 10 to 14 (Gardner). The product was a liquid of a viscosity at 25° C. of W to Z on the Gardner-Holdt scale. The resin was completely miscible with ethanol, butenol, toluene and xylene. It was excellently adapted for impregnating fibers of alphacellulose, as well as mats and fabrics of asbestos, or glass fibers to provide useful dielectrics.

*Sample 2*

A mixture of equal moles of furfural and a butenylphenol prepared in accordance with the previously described techniques, was catalyzed with 3 percent by weight, based upon the mixture of sodium hydroxide. The mixture was maintained at 25° C. for 48 hours to provide a resin product useful in forming dielectrics.

*Sample 3*

In this instance, a crotonaldehyde and butenylphenol mixture in the molar proportions of 4 to 1 was mixed with 4 percent by weight of sodium hydroxide, and reacted at 25° C. for 90 hours. This product was a liquid which could also be employed in the preparation of a dielectric material in accordance with the provisions of this invention.

*Sample 4*

In this instance, the aldehyde was acetaldehyde, employed in a proportion of 4 moles per mole butenylphenol mixture. The mixture was catalyzed with 4 percent by weight of sodium hydroxide and was likewise maintained at 25° C. for 90 hours to provide a resinous product useful for forming dielectric materials, which were hard and alkali-resistant.

Samples 1, 2 and 3 were neutralized by the use of acetic acid.

EXAMPLE C-3

In this example, a mixture of cyclopentenylphenols prepared as previously described, in an amount of 160 parts by weight, was incorporated with 130 parts of 37 percent formalin solution and 1 part by weight of sodium hydroxide in 5 parts by weight of water. The mixture was stirred at steam bath temperature (about 92 to 96° C.) for 1½ hours. The excess alkali was neutralized with acetic acid and the mixture was washed five times with water and was dried for several hours at steam bath temperature under a pressure of 20 to 50 millimeters of mercury (absolute). The product could be employed to impregnate fibrous materials such as paper, asbestos or glass fabrics. The impregnated material, when appropriately cured in the manner hereinafter described, constituted useful dielectrics.

EXAMPLE D-4

The phenolic component of this example comprised 20 parts by weight of a mixture comprising 12.3 percent unreacted phenol and ether (B. P. 70° C.–100° C. at 10 mm.), 66.3 percent monobutenylphenols (B. P. 110° C.–140° C. at 10 mm.), and 20.4 percent of di- and tributenylphenols, the mixture being obtained by the method of Example C. To this mixture of phenols were added 20 parts by weight of 37 percent aqueous formaldehyde and 0.4 part by weight of hexamethylenetetramine. The butenylphenol-formaldehyde mixture was heated under reflux on a steam bath for 16 hours. The water and unreacted formaldehyde were then removed by distillation, leaving a resin soluble in ethyl alcohol, ethyl acetate, benzene, toluene, and aromatic naphthas. This product was also useful in impregnating fibrous materials and, when so employed, the impregnate could be baked to provide a useful dielectric.

EXAMPLE E-5

In this example, 1515 grams of a mixture of di- and tri-butenylphenols, 300 grams of sodium hydroxide and 1500 grams of water were mixed to form a solution. To the solution were added 1215 grams of 37 percent formalin, the temperature of the mixture being maintained at 25° C. The mixture was blanketed with nitrogen and was let stand for 120 hours and was then acidified to a pH of 3.4. During the acidification, a lower water layer and a resinous top layer were formed and the water layer was withdrawn. The resinous layer was washed 5 times with water and was then distilled until a viscosity of W on the Gardner scale was obtained. The resultant liquid product, when applied to a fibrous reinforcement such as alphacellulose and cured by baking in the conventional manner, produced a hard strong body of high dielectric strength useful as an electrical insulating material.

EXAMPLE F-6

In accordance with this example, 1315.5 grams of a mixture of mono-, di- and tri-butenylphenols, 1440 grams of 37 percent formalin solution and 144 grams of aqueous ammonium hydroxide were admixed with stirring, the temperature of the mixture rising to 97° C. during the addition. The reaction mixture was then held at about 100° C. for 6 hours, after which the hot water layer was decanted and the remainder of the reaction mixture was distilled to strip-off excess water, formaldehyde and ammonium hydroxide. The product was a liquid of a solids content of 94.2 and was useful in forming fiber reinforced dielectrics in accordance with the present invention.

EXAMPLE G-7

A glass lined reactor was charged with the following mixture:

|  | Pounds |
|---|---|
| Mixed butenylphenols (monobutenylphenols, di- and tri-butenylphenols) | 24.6 |
| Formaldehyde (37 percent aqueous solution) | 27 |
| Sodium hydroxide | 1.7 |
| Water | 1.7 |
| Sodium hydrosulfite | 0.12 |

The resulting mixture was cooled to 75° to 80° F. and was agitated for 5 hours, after which it was allowed to stand for 43 hours. It was then acidified to a pH of 5 with 68 percent sulfuric acid and was allowed to stand until a water layer settled out. The water layer was drawn-off and discarded and the wet resin (36.25 pounds) was treated with 0.04 pound of an amino tetracarboxylic acid known commercially as Sequestrene AA. The resin was heated to 220° F. and was stripped with inert gas (nitrogen) until a Gardner viscosity of W at 75 percent solids in normal butanol was reached. The resin was then thinned with 10 pounds of butenol and was filtered at 110° F. The product was of the following characteristics:

Weight per gallon—8.45 pounds.
Solids—62.2 percent at 110° C.
Viscosity—Q to R on the Gardner scale.

This product was a valuable material for impregnating fibrous materials such as alphacellulose or glass fibers and could be applied by spraying, or dipping, to sheets of the latter materials.

The resultant impregnates could be cured by baking, thus forming useful dielectric bodies.

EXAMPLE H-8

The resinifiable charge in this example comprised:

|  | Grams |
|---|---|
| Mixture of pentenylphenols | 1620 |
| Formaldehyde (37% aqueous solution) | 100 |
| Sodium hydrosulfite | 8 |
| Sodium hydroxide (50% aqueous solution) | 200 |

The mixture was charged into a glass reactor where it was stirred, with exclusion of air, for 48 hours at a temperature of 25° to 30° C. The reaction mixture was acidified with 70 percent sulfuric acid until a pH of 5 was reached. The water layer which had formed, was drained off and 2 grams of Sequestrene AA were added to the resin layer. The resin layer was then dried by blowing with an inert gas for 3 hours at 100° C. to provide a resin having a viscosity of Z6. This resin with, or without thinning, could be employed to coat or impregnate fibrous materials. Useful dielectrics could be formed by baking the impregnates.

The foregoing condensates of butenylphenols and formaldehyde when employed to coat or impregnate fibrous materials are characterized by numerous exceptional properties. For example, the rate of cure when the bodies are subjected to heat and pressure is quite rapid, good cures being obtained in many instances in 30 minutes to 60 minutes. Other comparable condensation products often require several hours. Many of the products are characterized by exceptionally high dielectric strength, high mechanical strength, exceptionally light color and other useful properties. For purposes of demonstrating the utility of the foregoing condensation products as exemplified in the preceding Examples A-1 through H-8 tests were conducted in the following manner.

EXAMPLE I

Sheets of alphacellulose paper, much like a conventional decorative paper, were soaked in a liquid condensation product of a butenylphenol and formaldehyde prepared in accordance with the provisions of Example A-1, a number of hours being allowed in order to assure thorough soaking, although 15 or 20 minutes is usually adequate for the purpose. The sheets of wet paper were laid against a nearly vertical glass plate and excess resin was removed with a rubber squeegee roller. The sheets of paper were then reversed on the glass and the opposite sides were likewise rolled to remove any excess resin adhering thereto.

The sheets were subsequently stretched across a frame and the resin content thereof was precured in an oven at 350° F. for 10 to 15 minutes. It was determined that approximately 12 minutes constituted an optimum precure time which, when employed, resulted in sheets in which the resin had liquid flow and cohesiveness to produce excellent laminates in the subsequent curing and pressing operation (to be described) but at the same time the sheets were not so excessively tacky as to prevent, or hinder manipulation thereof in the laying up operations involved in forming the laminates.

A number of these partially cured sheets were laid up to form laminates of desired thickness and were then cured for one hour in a press at 300° to 320° F. under a pressure between 150 and 300 pounds per square inch.

A series of runs were conducted in the manner above described and the times, temperatures and pressures employed are tabulated as follows:

| Run | Precure | | Pressing | | |
|---|---|---|---|---|---|
|  | Time | Temp., ° F. | Time, hr. | Temp., ° F. | P. s. i. |
| 1 | 15 | 350 | 1 | 300–320 | 334.7 |
| 2 | 15 | 350 | 1 | 300–320 | 334.7 |
| 3 | 10 | 350 | 1 | 300–320 | 229 |
| 4 | 10 | 350 | 1 | 300–320 | 229 |

The products were of attractive, light yellow color having surfaces of high gloss, especially where they are of high resin content. The color in laminates of this type is regarded as being unusual; in so far as is presently known, no other phenolic resin will form corresponding laminates of such light color. Therefore, they are excellently adapted for use in applications where color is important. The products also have high mechanical strength and good dielectric properties.

These products were tested and compared with the standards for paper base laminates as established by the National Electrical Manufacturers Association in their publication No. LPI–1951, September 1951, and were found comparable to the better grades of electrical insulators as represented by the codes XXP, XXX, and XXXP, page 8 of that publication, but were greatly superior in tensile strength and dielectric strength, as determined for either short period, or stepwise application. The properties of condensates of butenylphenol, together with the corresponding standards, as established by the foregoing association, are hereby tabulated as follows:

| Resin | Butenyl- phenol- aldehyde Condensation Product | XXP | XXX | XXXP |
|---|---|---|---|---|
| Tensile strength (p. s. i.) | 16,750 | 6,000 | 5,000 | 5,000 |
| Dielectric constant | 4.95 | 5.3 | 5.8 | 4.8 |
| Dissipation factor | 0.038 | 0.060 | 0.046 | 0.035 |
| Dielectric strength (short time) | 772 | 360 | 360 | 360 |
| Power factor | 0.039 | 0.045 | 0.035 | 0.030 |

A further list of the several grades of resins and the applications for which they are adapted are as follows:

| | Requiring grade |
|---|---|
| Mechanical | X |
| Mechanical hot punching | P |
| Mechanical cold punching or shearing | PC |
| Electrical and mechanical | XX |
| Cotton fabric weighing less than 4 oz. used in fine machining applications | L |
| Same as L but for electrical applications requiring greater toughness than grade XX | LE |
| Continuous filament type glass cloth, general purpose grade | G3 |

In general, the resins herein disclosed, at least substantially meet the standards set up for the classes. Often they are much superior to these standards. Such a wide versatility in a single family of resins is unusual.

EXAMPLE II

In this example, the fibrous reinforcement was a cloth of fine glass fibers such as is conventionally used in the preparation of many laminates employed in the aircraft industry and for similar applications, where high strength is a prerequisite. The liquid resin employed was essentially the same as that obtained in Example G-7. Sheets of the glass fiber cloth were immersed in the liquid resin, were squeegeed on a glass plate and were precured for 10 minutes at 350° F. Two laminates were subsequently laid up, one of 12 plies, the other of 14 plies. These were cured for 60 minutes at a temperature of 300° F. The pressure in the mold was slight (about 10 to 30 p.s.i.). The mold closed completely (that is to the limit of travel of the sections where the mold stops came together and prevented further mold travel.

The properties of the cured laminates are tabulated as follows:

| | Laminate No. | |
|---|---|---|
| | I | II |
| Flexural strength, p.s.i. | 50,700 | 47,300 |
| Modulus of elasticity (flexure), p.s.i. | $2.38 \times 10^6$ | $3.12 \times 10^6$ |
| Tensile strength, p.s.i. | 49,100 | 35,000 |
| Modulus of elasticity (tensile), p.s.i. | $2.65 \times 10^6$ | |
| Elongation, percent | 1.76 | |
| Compression strength, p.s.i. | 31,000 | 31,500 |
| Water absorption, percent | 1.58 | 1.68 |
| Izod, Ft.-lbs/inch (notch) | 15.2 | 18.9 |
| Resin content, percent | 30.1 | 30.1 |
| Hardness, Barcol | 50-55 | 50-65 |
| Flame resistance | self-extinguish | self-extinguish |

Both of these products were of high modulus of elasticity and in general were of good properties adapting them for use wherever such good properties were desirable. The color was good.

The glass cloth reinforced laminates are good dielectrical materials. Laminated structural elements such as airplane parts and various other structural elements may be formed in like manner.

In the formulation of laminates embodying glass fiber cloth impregnated with butenylphenol-formaldehyde condensation products, it is considered that the percentage of the condensation product in the laminate may be varied within a range of about 10 to 70 percent by weight, dependent somewhat upon the applications to which the laminates are to be subjected. It is considered that a very satisfactory all-around material can be obtained with about 20 percent by weight of resin in the laminate.

It is to be understood that this invention contemplates the use of any of the several resins of Examples A-1 through H-8 in Examples I and II.

It is further to be understood that such resins as those of Examples A-1 through H-8 are compatible with other resins such as hard alkyds, vinyl acetate-vinyl chloride copolymers, varnishes of tung oil, linseed oil and modifications thereof with soluble phenol-formaldehyde resins, polyvinyl acetals such as polyvinyl butyral, condensation products of formaldehyde and urea or melamine, and resins which are the condensation products of epichlorohydrin and bisphenols such as bisphenol A and others. The present invention includes the use of alkenyl phenol-formaldehyde resins of Examples A-1 through H-8 when modified by dissolving with such added resins in the preparation of the laminates of Examples I and II or similar laminates.

The forms of the invention as herein disclosed are to be considered as being by way of illustration and not of limitation. It will be apparent that numerous modifications may be made therein without departure from the spirit of the invention or the scope of the appended claims.

We claim:

1. A laminate of high tensile strength, high dielectric strength and light color, comprising a fibrous sheet of fibers which are bonded by condensation products formed in the absence of free oxygen and free iron and being of about 0.5 to 5 moles of formaldehyde and 2 moles of a butenyl phenol mixture obtained by substitution of hydrogen in the benzene ring of phenol through reaction of phenol with butadiene in the presence of a Friedel-Crafts catalyst, the butenyl phenol mixture consisting primarily of compounds of the formulae:

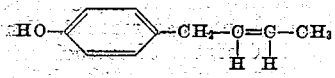

and

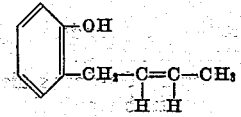

2. A body of light color, high tensile strength and high dielectric strength comprising a fibrous sheet material containing a binder which is a thermoset condensation product of about 1.5 moles of formaldehyde and about 1 mole of phenol mixture consisting mainly of the following components:

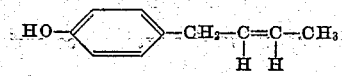

and

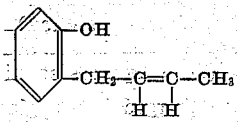

said condensation product being formed under non-oxidizing conditions and in the substantial absence of reactive iron.

3. A body of light color, high tensile strength and high dielectric strength comprising a sheet of fibrous material containing a thermoset binder which is a condensation product formed under non-oxidizing conditions and in the substantial absence of reactive iron and being composed of about 1.5 moles of formaldehyde and a mixture of about 2 moles of alkenyl phenols derived by the reaction of phenol and butadiene in the presence of a Friedel-Crafts catalyst, said phenols consisting mainly of the following compounds:

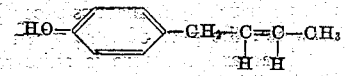

and

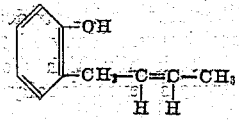

4. A body of high tensile strength, high dielectric strength and light color, comprising a sheet of alpha cellulose fibers containing as a binder, a thermoset resin which is a condensation product in an alkaline medium under non-oxidizing conditions and in the substantial absence of iron, of about 1.5 moles of formaldehyde and about 2 moles of mixed alkenyl phenols obtained by addition reaction of phenol and butadiene in the presence of a Friedel-Crafts type catalyst, said mixture of phenols consisting mainly of the following components:

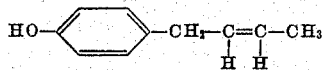

and

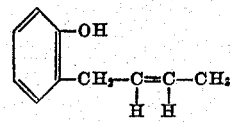

5. A method of forming a laminated fibrous sheet comprising the steps of impregnating a plurality of sheets of alpha cellulose fibers with a liquid condensation product of 0.5 to 5 moles of formaldehyde to 1 mole of a mixture consisting mainly of 2 butenyl phenols respectively of the formulae:

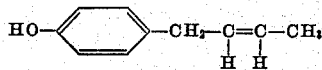

and

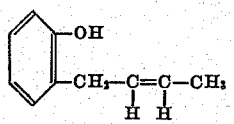

said condensation product being formed under non-oxidizing conditions and in the substantial absence of reactive iron, precuring the condensate while the sheets are separate from each other for about 10 to 15 minutes but to a state in which they are still cohesive, stacking the sheets and completing the cure to form said laminate.

6. A method of forming a laminate of fibrous sheets comprising the steps of impregnating a plurality of sheets of alpha cellulose with a liquid condensation product formed under non-oxidizing conditions and in the substantial absence of reactive iron, the condensation product being of about 1.5 moles of formaldehyde and about 2 moles of two butenyl phenols respectively of the formulae:

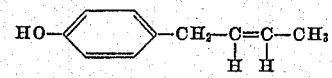

and

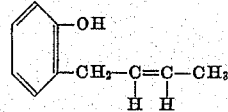

partially precuring the condensate while the sheets are separate, stacking the sheets and completing the cure.

References Cited in the file of this patent

UNITED STATES PATENTS

| | | |
|---|---|---|
| 2,006,043 | Dykstra | June 25, 1935 |
| 2,175,393 | Hentrich | Oct. 10, 1939 |
| 2,415,763 | Ryan | Feb. 11, 1947 |
| 2,587,578 | Jones | Mar. 4, 1952 |
| 2,631,140 | Bloch | Mar. 10, 1953 |
| 2,675,335 | Rankin et al. | Apr. 13, 1954 |